United States Patent [19]

Teller

[11] 4,327,670

[45] May 4, 1982

[54] WASTE HEAT RECOVERY UNIT

[76] Inventor: Charles J. Teller, 976 Weikel Rd., Lansdale, Pa. 19446

[21] Appl. No.: 154,841

[22] Filed: May 30, 1980

[51] Int. Cl.³ ............................................. F22B 33/00
[52] U.S. Cl. ................................... 122/20 B; 122/421
[58] Field of Search .............................. 122/20 B, 421

[56] References Cited

U.S. PATENT DOCUMENTS

| | | | |
|---|---|---|---|
| 4,037,567 | 7/1977 | Torres | 122/20 B |
| 4,037,786 | 7/1977 | Munroe | 237/19 |
| 4,048,962 | 9/1977 | Pristelski | 122/421 |
| 4,163,430 | 8/1979 | Neumann | 122/20 B |
| 4,178,907 | 12/1979 | Sweat, Jr. | 122/20 B |
| 4,210,102 | 7/1980 | Dosmann | 122/421 |

*Primary Examiner*—Henry C. Yuen
*Attorney, Agent, or Firm*—Benasutti Associates, Ltd.

[57] ABSTRACT

An apparatus for the recovery of heat from waste gases is disclosed. The apparatus generally comprises a heat recovery coil which is located above the combustion chamber of a furnace and in the path of waste gases psssing through a flue, a circulation pump and an expansion manifold. The apparatus is equally useful in new as well as retrofitted applications.

4 Claims, 1 Drawing Figure

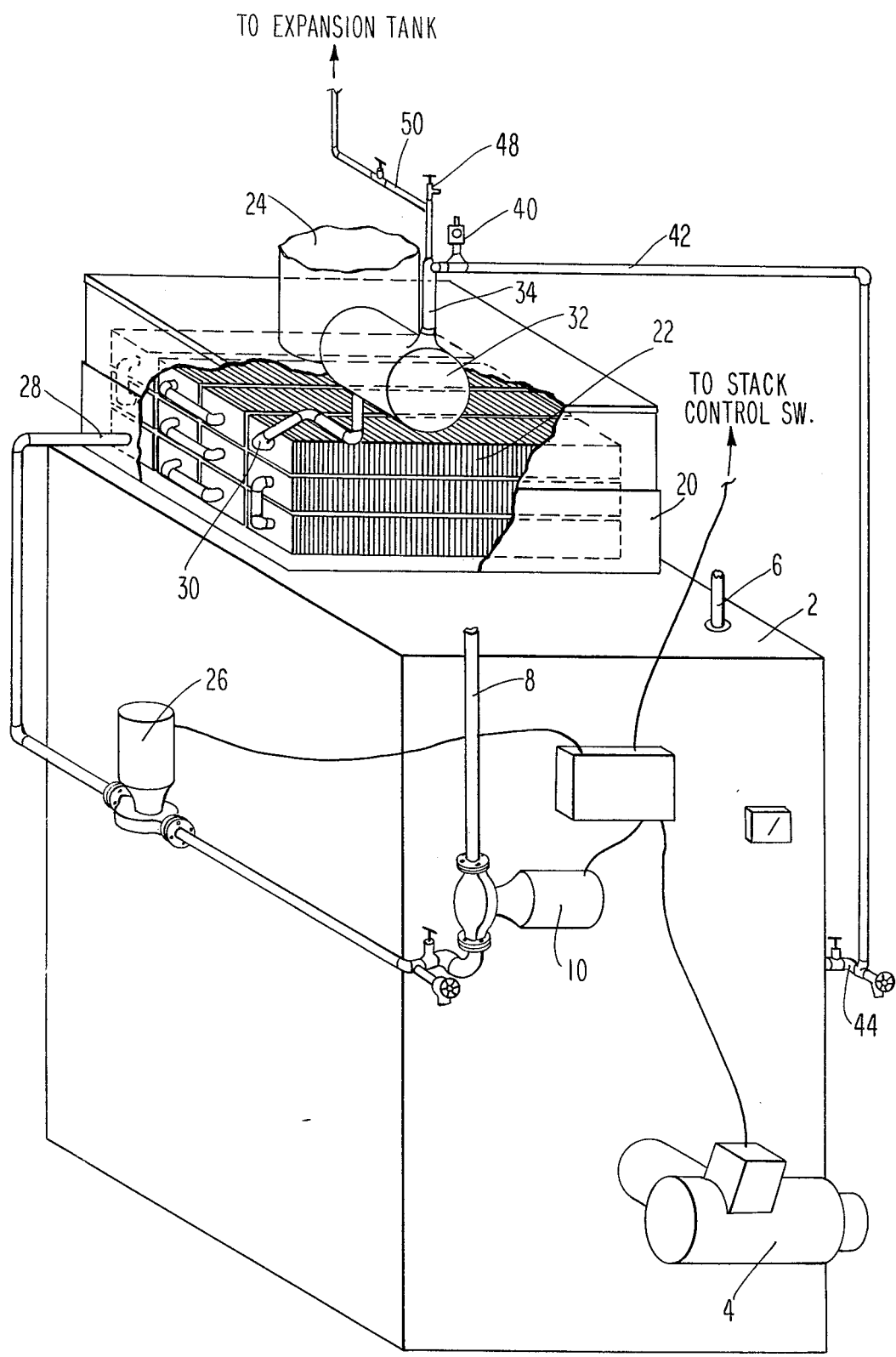

WASTE HEAT RECOVERY UNIT

BACKGROUND OF THE INVENTION

1. Field of the Invention

The disclosed invention resides broadly in the field of waste heat recovery and more specifically in the field of waste heat recovery from the flue pipe of a boiler or furnace. The disclosed apparatus is particularly useful for recovering heat from the flue pipe used for venting the waste products of combustion in hot water boilers and heating systems generally found in domestic use.

The apparatus is intended to be equally compatible with new installations as well as to be retrofitted to an existing system.

2. Prior Art

It has been known for some time that the heat which is lost through the flue pipe or exhaust stack is recoverable and may be used for a number of different purposes such as, providing hot water in a home, providing hot water for use in an industrial establishment, or providing heat in either industrial or home use. However, the majority of prior art systems have required that a separate or independent system be constructed to use the heat recovered from the flue pipe or that a storage tank or the like be used to store water which has been heated in this manner.

The following are prior art examples of attempts to recover and use waste heat found in exhaust gases.

U.S. Pat. 2,035,341 entitled, "WATER HEATER", issued on Mar. 24, 1936 to William A. Radloff. The device disclosed in U.S. Pat. No. 2,035,341 is a system add-on which encircles the flue pipe with a plurality of water or fluid containing conductor tubes to capture heat which is radiating from the flue pipe. In an alternative embodiment there is a manifold or fluid containing arrangement which is to be located within the flue pipe. However, in both embodiments the utilization of the recovered heat is through an auxillary storage tank or heating system.

U.S. Pat. No. 2,173,887 entitled, "FLUE GAS WATER HEATER", issued on Sept. 26, 1939 to James I. Shute. U.S. Pat. No. 2,173,887 discloses a waste heat reclamation system for a water heater which comprises a water flue tube gas water heater connected to an open storage tank whereby free circulation of the fluid is had through the natural circulation of the fluid.

U.S. Pat. No. 2,189,749 entitled, "WATER HEATER" issued on Feb. 13, 1949 to Fred T. Windheim and John Windheim. U.S. Pat. No. 2,189,749 provides a domestic water heater and a boiler booster in a single unit. The water supply to the domestic hot water heater unit is first pre-heated in the boiler unit which holds the hot water supply in check until the water temperature reaches a pre-determined level, at that point the water is permitted to enter the auxillary system whereby the temperature of the water is increased utilizing the heat recovered from the flue gas.

U.S. Pat. No. 4,037,567 entitled, "WATER HEATER SYSTEM INCLUDING RECYCLE LOOP", issued on July 26, 1977 to Peter L. Torres. U.S. Pat. No. 4,037,567 discloses a hot water heater having a re-circulation loop which draws off a portion of the water being fed to the boiler and circulates it in a recycle loop to extract heat from the waste gases. After heating, that portion of water is mixed with the water supply being fed to the boiler and thereby raise the temperature of the water supply being fed to the boiler unit.

A difficulty with the prior art waste heat recovery systems have been that they have failed to recover all of the available waste heat and to address the problems of water temperature differential during start-up of a boiler or furnace system. During the start-up period there is a tremendous amount of heat available at the flue which may be recovered and utilized to raise the temperature of the water in the recovery unit. However, after extracting the waste heat, difficulty is encountered in returning the heated water from the coil to the main boiler supply, because of temperature differential. This water temperature differential is due to the larger volume contained in the main boiler and the time required to raise it to a comparable temperature range. The result of different temperature levels mixing creates a banging or knocking problem. Additionally, when attempting to recover maximum heat from the flue pipe it is important to maintain the temperature of the flue pipe for natural updraft and to prevent a dewing condition within the flue pipe.

SUMMARY OF THE INVENTION

The instant invention provides an auxillary waste heat recovery apparatus which incorporates a circulator, a closed loop heat recovery coil, a manifold, and an air release expansion tank arrangement.

It is an object of this invention to provide an apparatus which may be retrofitted to existing systems, as well as, installed in the new installations.

It is an object of this invention to provide a system which may be varied to recover the maximum heat available from the waste gases of a boiler or furnace.

BRIEF DESCRIPTION OF THE DRAWING

FIG. 1 is a perspective view of a heat recovery unit according to the instant invention as retrofitted to a typical hot water boiler or furnace.

DESCRIPTION OF THE PREFERRED EMBODIMENT

Referring now to the FIGURE, there is shown a hot water boiler or furnace 2, having a burner system 4, for burning an energy source such as gas or fuel oil to produce heat. Boilers or furnaces such as that shown in the FIGURE, are well known in the art and will not be described in detail. It is sufficient for the purposes of further description to outline the function of such a heater or furnace. The water which is to circulate in the system has been provided as is known in the art. This water is then heated by means of a boiler system, again known in the art, which is contained within the furnace or heater 2. As is known in the art, heated water will be fed to the system through the feed pipe 6, and return from the system through the return line 8. A circulating pump 10 is provided on the return line 8, as an aid in drawing the cooler water back to the boiler for reheating. The function of the circulation pump 10, will be known to those in the art and need not be explained further herein. There is in the system depicted in the FIGURE, a stack control switch which is wired into the control panel of the furnace 2. The function of a control stack switch is well known and may simply be stated as a way of assuring that there is combustion in the fire box while fuel is being supplied to the furnace. The stack control switch assures that should combustion cease, the burner will be shut down and prevent the dumping of raw fuel into the fire box. A stack control switch is a common item of which White-Rogers Controls Co. is one manufacturer. In some furnace systems the stack control switch is eliminated in favor of a photocell or elecrical eye arrangement which is positioned so as to monitor the flame produced by the burner. Both the stack control switch and the electric eye will be familiar to those in the art and do not form part of the invention.

As shown in the FIGURE, the recover apparatus is depicted as installed in a general application, as in a residential heating system. The existing bonnet or smoke chamber of the system has been modified or extended at 20 to accommodate heat recovery coil 22. The heat recovery coil 22, is comprised of copper tubing having a plurality of metallic fins which will be recognized in the art as the hot water tubes used in a baseboard hot water heating system. The heat recovery coil 22, is disposed in the smoke chamber or bonnet between the fire box of the heater and the flue pipe 24. Flue pipe 24 will be recognized as a standard flue pipe which directs the gas or the waste material of the combustion products away from the furnace to a chimmney or stack. Heat recovery coil 22, is fed by a circulation pump 26, which draws water from the down side of circulation pump 10. In this way the water which is fed through the circulation pump 26 to the coil 22, is water which has not been exposed to heat generated by the furnace or in the event that it has been exposed to heat generated by the furnace, it has already surrendered all of the heat which would normally be surrendered by this water prior to being re-heated by the system. The water provided by circulator 26 is then passed to the inlet side 28 of coil 22. The water within heat recovery coil 22 then circulates through the system of tubing, much in the manner of a radiator or condensor, and is heated by the hot exhaust gas.

Circulating pump 26 is wired such that it will begin circulating the water in recovery coil 22 at the same time as the burner 4 is fired up. This immediate circulation of the water prevents steam buildup in the upper levels of the coil 22 and returns maximum heat to the main boiler. Additionally, it must be remembered that circulation pump 10 is not wired to circulate water at burner fire up and will only circulate after the temperature of the water has risen. Thus, it is possible without circulation pump 26 to have a condition where hot or heated water is rising through opposed pipes on either side of coil 22. This could result in steaming, knocking and/or vapor locks. Circulation pumps 10 and 26 are Taco Circulators which are well known in the art.

As can be readily appreciated, the amount of tubing used to fabricate coil 22 may be varied according to the size of the system and the amount of heat available for recovery. Likewise, it is obvious that the tubing may be staggered vertically instead of the aligned stacking shown. The outlet side 30 of heat recovery coil 22 is connected to an manifold 32 to compensate for steam and other temperature differentials. Through the use of manifold 32 the fluid or water in the coil 22, may be heated to a temperature above that of the main boiler without the knocking normally associated with temperature differentials. The manifold 32 also provides a natural accumulation point for steam which may be generated by the upper coils at the initial start-up of the burner and before the temperature of the coil 22 has equalized itself.

Referring again to the FIGURE, the manifold 32 has an outlet pipe 34 which is connected by way of a T-fitting to a safety valve 40. Safety valve 40 is a common pressure release valve which will be known to those in the art. A hot water line 42 extends from the outlet side of safety valve 40 to the inlet side 44, of the hot water boiler of the main system. Thus, the water which has been heated by the coil 22 is fed back into the boiler and mixes with the water in the main system. It should be noted at this time that in some systems the water inlet to which hot water pipe 44 has been connected may not be provided. In some boiler systems, therefore, it will be necessary to tap the boiler so that the hot water in pipe 44 may be supplied to the system.

Referring again to the outlet pipe 34 of manifold 32, it can be seen that on the remaining nipple of the T-connection there is provided an air release valve 48 which is a common release valve used for bleeding air from the systems and will be known to those in the art. Also connected at the same nipple and just below the air release valve 48, is an expansion tube 50 which is connected to the expansion tank of the main system. Again expansion tanks will be known to those in the art.

It is understood that the invention may be modified by those having skill in the art and that the scope of my invention is set forth in the claims appended hereto.

Having fully disclosed my invention, I claim:

1. In a water heating system which includes a boiler means for heating the water within said system, a first conduit means for removing heated water from said boiler, a second conduit means for returning said water to said boiler and an exhaust flue for discharging waste products of combustion from said system, an apparatus for recovering heat from said waste products of combustion, said apparatus comprising:

a coil of heat conductive material positioned within said exhaust flue, said coil having an inlet and an outlet;

first means for diverting water from said water in said second conduit means for returning water to said boiler to the input of said coil;

manifold means, having an input side and an output side;

first means for directing said diverted water from the outlet of said coil to said manifold means input side;

second means for diverting said diverted water from said manifold means output side to said boiler; an expansion valve is mounted in line between said manifold means output side and said boiler; and said manifold means further comprises a split output whereby a bleeder valve is mounted on said output side.

2. The apparatus of claim 1 wherein:
said coil of heat conductive material is metallic.

3. The apparatus of claim 1 further comprising:
means for pumping water diverted from said second conduit to the input side of said coil.

4. The apparatus of claim 1 wherein:
said manifold means output side is in communication with an expansion tank.

* * * * *